United States Patent
Suzuki et al.

(10) Patent No.: US 8,777,811 B2
(45) Date of Patent: Jul. 15, 2014

(54) VEHICULAR SHIFT CONTROL DEVICE

(75) Inventors: Toshinari Suzuki, Miyoshi (JP); Kenta Kumazaki, Toyota (JP); Yoshiki Ando, Anjo (JP); Masakazu Kaifuku, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 290 days.

(21) Appl. No.: 13/378,072

(22) PCT Filed: Jun. 17, 2009

(86) PCT No.: PCT/JP2009/061041
§ 371 (c)(1),
(2), (4) Date: Dec. 14, 2011

(87) PCT Pub. No.: WO2010/146677
PCT Pub. Date: Dec. 23, 2010

(65) Prior Publication Data
US 2012/0094800 A1    Apr. 19, 2012

(51) Int. Cl.
*B60W 10/04* (2006.01)
*B60W 10/10* (2012.01)

(52) U.S. Cl.
USPC ............................................. 477/109; 477/20

(58) Field of Classification Search
USPC .............. 477/3, 5, 15, 20, 91, 109; 180/65.28
See application file for complete search history.

(56) References Cited

U.S. PATENT DOCUMENTS

| 2005/0239597 | A1 | 10/2005 | Shimada |
| 2009/0088290 | A1* | 4/2009 | Tabata et al. ...................... 477/5 |
| 2009/0137364 | A1* | 5/2009 | Honma .......................... 477/175 |
| 2009/0156359 | A1* | 6/2009 | Tabata et al. .................. 477/108 |

FOREIGN PATENT DOCUMENTS

| DE | 102008018969 | * | 1/2009 |
| JP | 58 152939 | | 9/1983 |
| JP | 2004 204960 | | 7/2004 |
| JP | 2005 315098 | | 11/2005 |
| JP | 2007 16964 | | 1/2007 |

OTHER PUBLICATIONS

International Search Report Issued Aug. 11, 2009 in PCT/JP09/61041 Filed Jun. 17, 2009.

* cited by examiner

*Primary Examiner* — Justin Holmes
*Assistant Examiner* — Stacey Fluhart
(74) *Attorney, Agent, or Firm* — Oblon, Spivak, McClelland, Maier & Neustadt, L.L.P.

(57) ABSTRACT

A vehicular shift control device is provided that controls the input rotational speed of a geared transmission by adjusting the rotational speed of a drive source at downshift of the geared transmission. The greater the deceleration of the vehicle, the smaller is set the change gradient of the input rotational speed of the geared transmission. Therefore, even if the decrease rate of the post-shifting synchronization rotational speed is great, the incident angle γ of the input rotational speed of the geared transmission relative to the post-shifting synchronization rotational speed is maintained as a large angle. Even when the deceleration of the vehicle during downshift is great, the downshift is smoothly executed without producing an excessive synchronization shock.

12 Claims, 8 Drawing Sheets

|  | C1 | C2 | C3 | B1 | B2 | F1 |
|---|---|---|---|---|---|---|
| 1st | ○ |  |  |  | (○) | ○ |
| 2nd | ○ |  |  | ○ |  |  |
| 3rd | ○ | ○ |  |  |  |  |
| 4th |  | ○ |  | ○ |  |  |
| R |  |  | ○ |  | ○ |  |
| N |  |  |  |  |  |  |

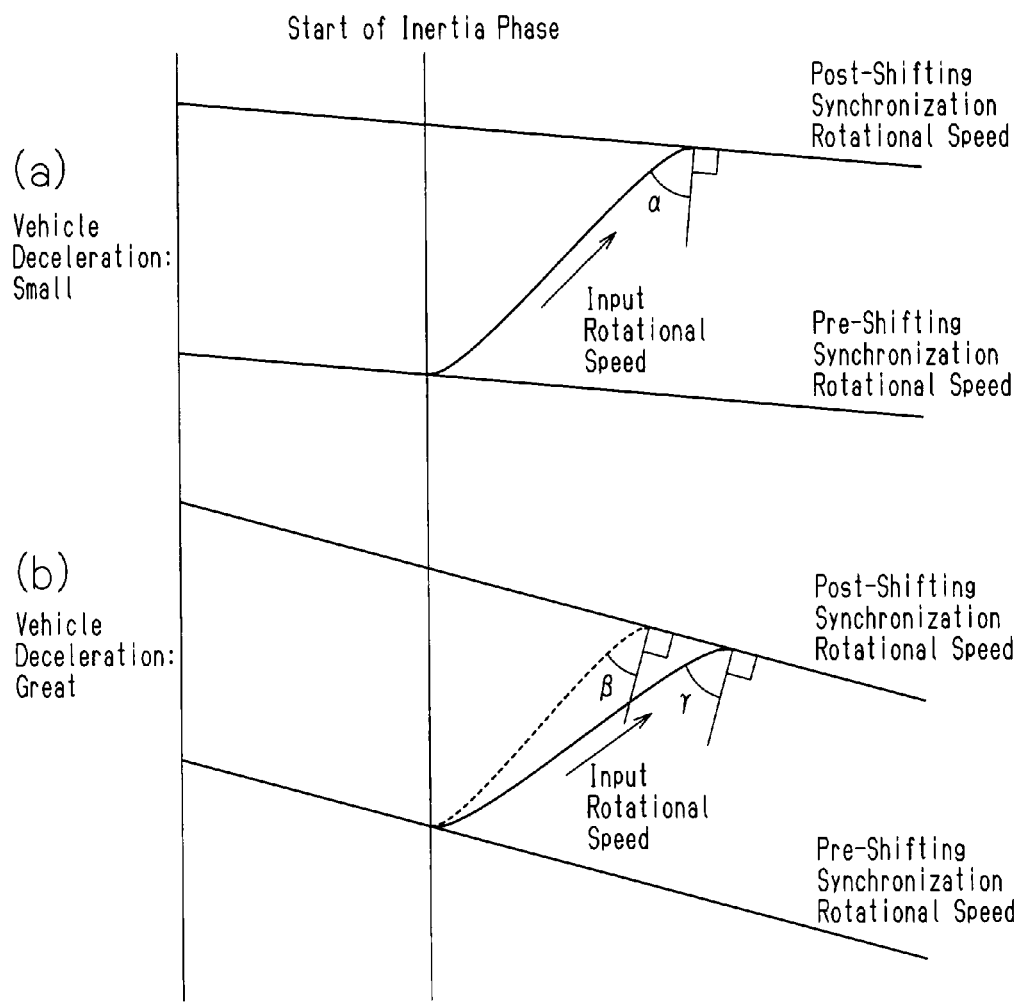

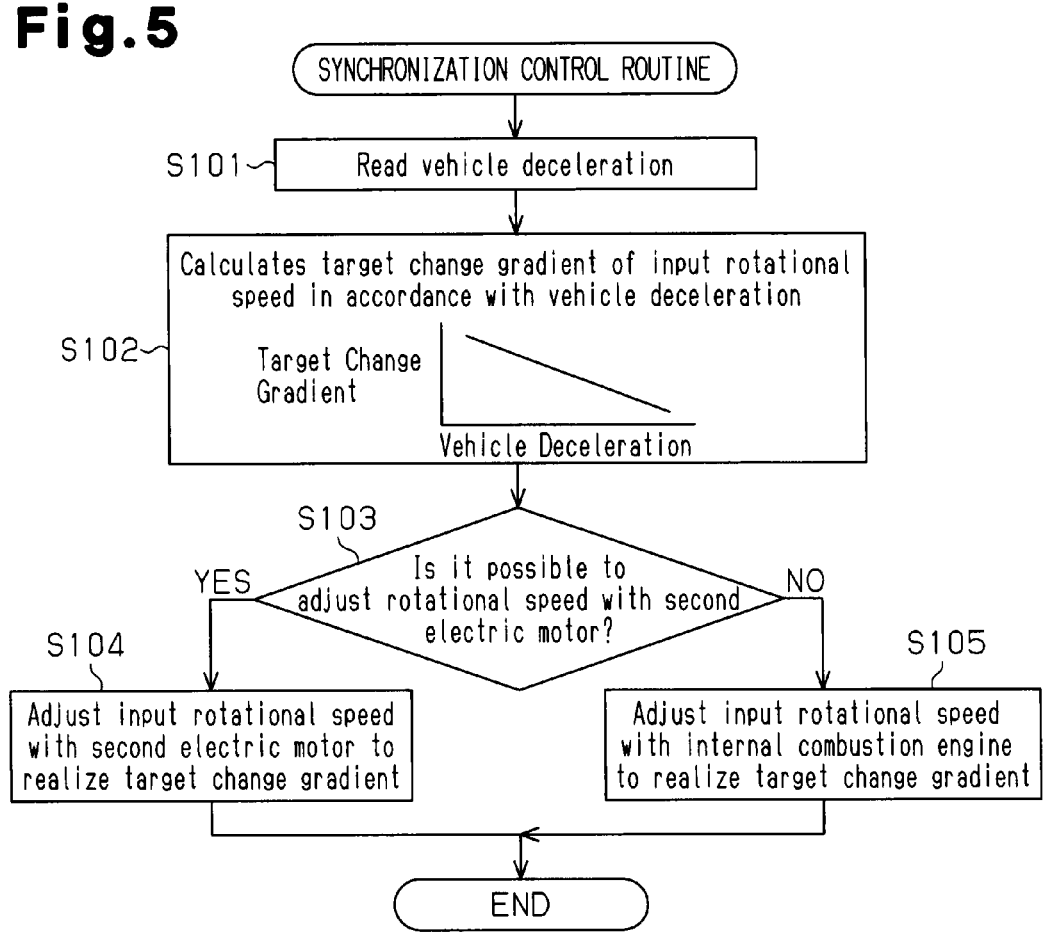
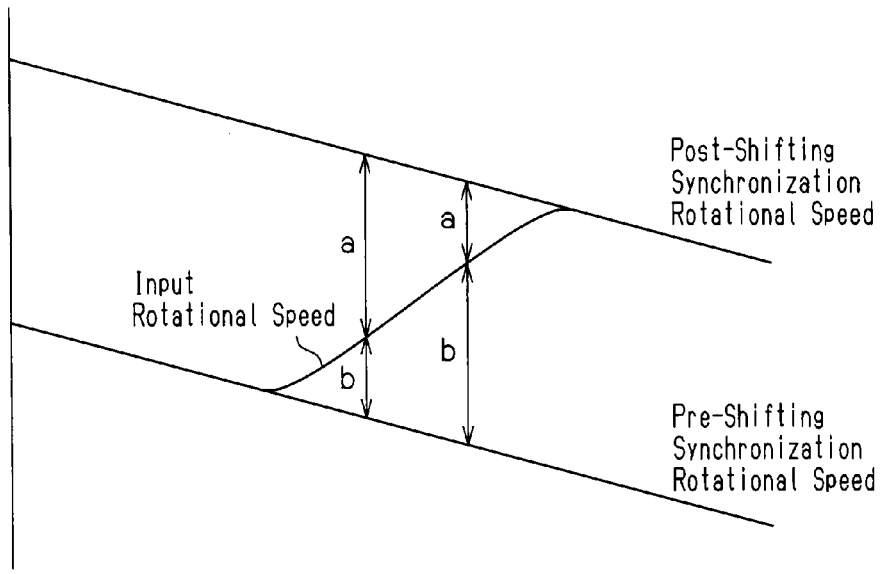

VEHICULAR SHIFT CONTROL DEVICE

FIELD OF THE INVENTION

The present invention relates to a vehicular shift control device, and more particularly, to an improvement of a control configuration for avoiding synchronization shocks.

BACKGROUND

In recent years, hybrid vehicles, which have two types of drive sources, an internal combustion engine and an electric motor, have been put in practical use to improve fuel efficiency and emission. As a hybrid system functioning as a drive source for such a hybrid vehicle, a system has been put in use that includes an internal combustion engine, two electric motors, and a power distribution mechanism formed by a planetary gear mechanism. Such a hybrid system controls the rotational speed of the internal combustion engine via power running operation and regeneration operation of the first electric motor. The system also assists the drive torque and the braking torque of the vehicle via power running operation and regeneration operation of the second electric motor.

A type of hybrid vehicles has been known in which a hybrid system is connected to a geared transmission that shift gears via engagement and disengagement of frictional engagement elements such as clutches and brakes. In such a hybrid vehicle, when shifting gears of the geared transmission, synchronization of the frictional engagement elements of the transmission can be achieved by controlling the input rotational speed of the transmission using an electric motor.

Conventionally, a device disclosed in Patent Document 1 has been known as a shift control device for a hybrid vehicle. In the shift control device disclosed in Patent Document 1, the change rate of a target rotational speed of a second electric motor is variably set in accordance with the degree of progress of shifting at power-on downshift of a geared transmission. This prevents the torque from being undesirably lowered during shifting.

Also, a device disclosed in Patent Document 2 has also been known in the art as a shift control device for a hybrid vehicle. In the shift control device disclosed in Patent Document 2, it is determined, in accordance with the traveling state of a vehicle, which one of response to shifting and reduction of synchronization shock at downshift should be given priority. According to the result of the determination, the change gradient (change rate) of the engine speed during downshift, that is, the change gradient of the input rotational speed of the geared transmission is varied. When the deceleration of the vehicle is great, it is determined that the response to shifting is given priority, and the change gradient of the input rotational speed of the geared transmission during downshift is increased.

PRIOR ART DOCUMENTS

Patent Documents

Patent Document 1: Japanese Laid-Open Patent Publication No. 2004-204960
Patent Document 2: Japanese Laid-Open Patent Publication No. 2005-315098

SUMMARY OF THE INVENTION

Problems that the Invention is to Solve

When the deceleration of the vehicle is great, shock is less likely to be sensed. Therefore, a slight increase in shock can be permitted. However, as described below, in the shift control device of Patent Document 2, in which the change gradient of the input rotational speed of the geared transmission is increased in accordance with increase in the deceleration of the vehicle, synchronization shock that is too excessive to be permitted can occur if the vehicle deceleration is great.

FIG. 12(a) shows changes in the input rotational speed of a geared transmission during a downshift when the deceleration of a vehicle is relatively small. As in the diagram, downshift of the geared transmission is achieved by changing the input rotational speed from pre-shifting synchronization rotational speed to a post-shifting synchronization rotational speed. At this time, the shift control device according to Patent Document 2 gives priority to reduction in the synchronization shock if the deceleration of the vehicle is small. Thus, the change gradient in a speed increase of the input rotational speed after the start of an inertia phase is made small. Also, in this state, the change gradient in a speed reduction of the post-shifting synchronization rotational speed is gentle. Therefore, when the deceleration of the vehicle is small, the incident angle of the input rotational speed relative to the post-shifting synchronization rotational speed is a large angle α, and downshift is smoothly executed without producing shift shock. The incident angle of the input rotational speed relative to the post-shifting synchronization rotational speed refers to an intersecting angle of a change curve of the post-shifting synchronization rotational speed and a change curve of the input rotational speed.

FIG. 12(b) shows changes in the input rotational speed of the geared transmission during downshift when the deceleration of the vehicle is relatively great. In this case, the shift control device of Patent Document 2 gives priority to the shifting response and therefore sets the change gradient in a speed increase of the input rotational speed after the start of the inertia phase to a great value. At this time, the change gradient is great in a speed reduction of the post-shifting synchronization rotational speed. The incident angle of the input shaft rotational speed relative to the post-shifting synchronization rotational speed is a small angle β. The smaller the incident angle of the input rotational speed of the geared transmission relative to the post-synchronization rotational speed, the greater the synchronization shock of the geared transmission. Therefore, in the shift control device of Patent Document 2, the synchronization shock increases exponentially in accordance with increase in the deceleration. Thus, although shock is less likely to be sensed when the deceleration of the vehicle during shifting is great, the synchronization shock can be increased to a level that is not permissive.

Problems as described above can occur in a similar manner in vehicles other than hybrid vehicles. Specifically, the problems can occur in any vehicle in which synchronization of frictional elements of a geared transmission is attempted by controlling the input rotational speed of the geared transmission via adjustment of the rotational speed of the drive source during downshift.

Accordingly, in a vehicular shift control device that controls the input rotational speed of a geared transmission by adjusting the rotational speed of a drive source, it is an objective of the present invention to allow the shift control device to smoothly perform downshift without producing an excessive synchronization shock even when the deceleration of the vehicle is great during the downshift.

To achieve the foregoing objective, and in accordance with one aspect of the present invention, a vehicular shift control device of the present invention includes a geared transmission that changes and outputs rotation of a drive source mounted on a vehicle, and a control section that adjusts, at downshift of the geared transmission, a rotational speed of the drive source, thereby controlling the input rotational speed of the geared transmission. The control section operates such that the greater deceleration of the vehicle, the smaller becomes the change gradient of the input rotational speed of the geared transmission.

According to the vehicular shift control device according to the present invention, the change gradient (change rate) of the input rotational speed of the geared transmission during downshift is reduced when the deceleration of the vehicle is great. Therefore, when the deceleration of the vehicle is great and the change gradient in a speed reduction of the post-shifting synchronization rotational speed is great, the incident angle of the input rotational speed of the geared transmission relative to the post-shifting synchronization rotational speed is maintained to a large angle. Therefore, according to the shift control device of the present invention, downshift is smoothly executed without producing an excessive synchronization shock even when the deceleration of the vehicle is great during downshift.

The change gradient of the input rotational speed of the geared transmission during downshift can be calculated in accordance with the vehicle deceleration and the degree of progress of shifting in the geared transmission, or can be calculated in accordance with the vehicle deceleration and the deviation between the input rotational speed and the synchronization speed in the geared transmission. Adjustment of the change gradient of the input rotational speed of the geared transmission in accordance with the vehicle deceleration can be performed by variably setting a target value of the post-shifting synchronization rotational speed of the geared transmission in accordance with the vehicle deceleration. In these cases, the change gradient of the input rotational speed of the geared transmission can be changed in accordance with the degree of shifting progress, so that the downshift is executed in a more favorable manner.

Specifically, reduction in the change gradient of the input rotational speed of the geared transmission in accordance with the vehicle deceleration may be executed by the control section in a stage immediately before the completion of the downshift. The incident angle of the input rotational speed of the geared transmission relative to the post-shifting synchronization rotational speed can be made a large angle as long as the change gradient of the input rotational speed at a stage immediately before downshift is kept small, regardless of the change gradient of the input rotational speed at a first half of the downshift. That is, synchronization shock can be reduced if the change gradient of the input rotational speed is reduced at the stage immediately before the downshift. Accordingly, the reduction in the shift shock and improvement of the shifting response can both be achieved by reducing the change gradient of the input rotational speed at a stage immediately before the completion of the downshift and preventing the change gradient from being reduced in the previous stages.

A geared transmission includes a plurality of frictional engagement elements such as clutches, brakes, and one-way clutches, and performs shifting through engagement and disengagement of the frictional engagement elements. Among these frictional engagement elements, frictional engaging force of the clutches and brakes can be gradually increased at the engagement, so as to reduce the synchronization shock. In contrast, the one-way clutch has no such function for reducing synchronization shock. When downshift is completed by engagement of a one-way clutch, synchronization shock is more likely to be produced. Therefore, the vehicular shift control device of the present invention as described above is suitably applied to a vehicle in which downshift is completed by engagement of a one-way clutch in a geared transmission.

If the torque transmitting capacity of the frictional engagement elements of a geared transmission during downshift is made zero, shock reduction via increase in the frictional engaging force of the frictional engagement elements cannot be expected. Therefore, the vehicular shift control device of the present invention as described above is suitably applied to a vehicle in which, during downshift of the geared transmission, the torque transmitting capacity of the frictional engagement elements in the geared transmission is reduced to zero transmission capacity.

The vehicular shift control device according to the present invention can be used in a vehicle that is a hybrid system in which the drive source includes an internal combustion engine and an electric motor. In such a vehicle, which has a hybrid system as a drive source, the input rotational speed of the geared transmission during downshift can be controlled either by adjusting the rotational speed of the electric motor or adjusting the rotational speed of the internal combustion engine. Basically, control of the input rotational speed of the geared transmission during downshift can be more easily executed by adjusting the rotational speed of an electric motor. Even in such a case, if the input rotational speed cannot be controlled by adjusting the rotational speed of the electric motor due to shortage of electricity for driving the electric motor or overheating of the electric motor, the input rotational speed may be controlled by adjusting the rotational speed of the internal combustion engine.

BRIEF DESCRIPTION OF THE DRAWINGS

FIG. 4 is a graph showing changes in the input rotational speed of the geared transmission during downshift in the first embodiment, where section (a) shows a case where the vehicle deceleration is small, and section (b) shows a case where the vehicle deceleration is great;

FIG. 5 is a flowchart showing a procedure executed by the electronic control unit in a synchronization control routine employed in the first embodiment;

FIG. 6 is a graph showing a mode of determination for the degree of progress of shifting in a geared transmission of a vehicular shift control device according to a second embodiment of the present invention;

DETAILED DESCRIPTION OF PREFERRED EMBODIMENT

First Embodiment

A vehicular shift control device according to a first embodiment of the present invention will now be described with reference to FIGS. 1 to 5. In the present embodiment, the invention is applied to a shift control device for a hybrid vehicle that has a hybrid system as a drive source. The hybrid system includes one internal combustion engine and two electric motors.

Figure 1:
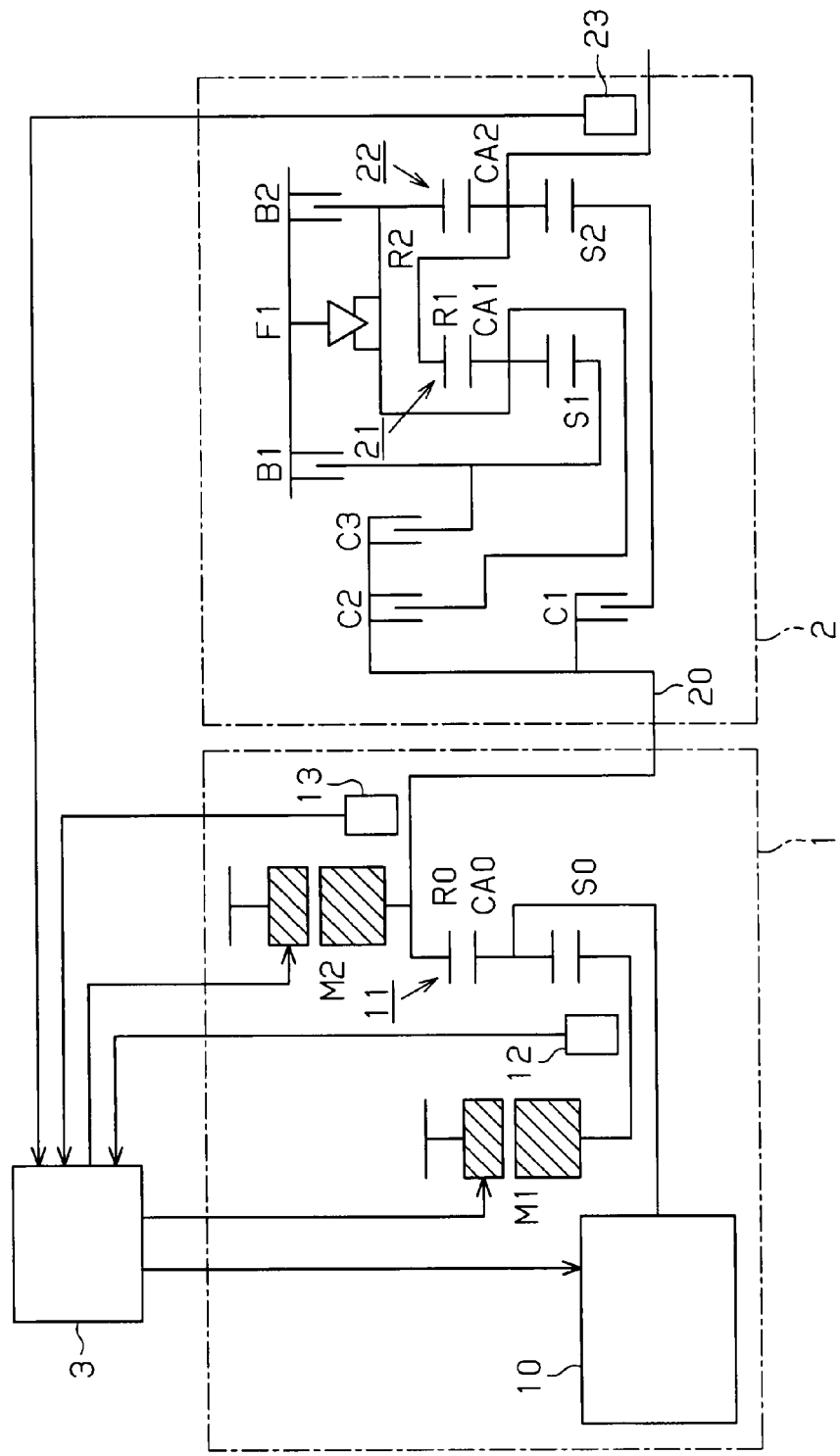
FIG. 1 is a skeleton diagram schematically showing the structure of the drive-train of a vehicle to which a transmission device for a vehicle according to a first embodiment of the present invention is applied.

FIG. 1 shows the configuration of the drive-train of a hybrid vehicle to which the present embodiment is applied. As shown in the drawing, the drive train of the hybrid vehicle includes a hybrid system 1 serving as a drive source and a geared transmission 2.

The hybrid system 1 includes an internal combustion engine 10, two electric motors (a first electric motor M1 and a second electric motor M2), and a power distribution mechanism 11 formed by a planetary gear mechanism. The power distribution mechanism 11 includes a carrier CA0, a sun gear S0, and a ring gear R0. The carrier CA0 is connected to and integrally rotatable with the output shaft of the internal combustion engine 10. The sun gear S0 is connected to and integrally rotatable with the rotor of the first electric motor M1. The ring gear R0 is connected to and integrally rotatable with the rotor of the second electric motor and an input shaft 20 of the geared transmission 2. The hybrid system 1 also includes a first resolver 12 for detecting the rotational speed of the first electric motor M1 and a second resolver 13 for detecting the rotational speed of the second electric motor M2.

The geared transmission 2 includes two planetary gear mechanisms, that is, a front planetary gear mechanism 21 and a rear planetary gear mechanism 22. The front planetary gear mechanism 21 has a sun gear S1, a carrier CA1, and a ring gear R1. The rear planetary gear mechanism 22 includes a sun gear S2, a carrier CA2, and a ring gear R2. The carrier CA2 is connected to and integrally rotatable with the ring gear R1 of the front planetary gear mechanism 21. The ring gear R2 is connected to and integrally rotatable with the carrier CA1 of the front planetary gear mechanism 21.

The geared transmission 2 further includes a plurality of frictional engagement elements, or three clutches C1, C2, C3, two brakes B1, B2, and a one-way clutch F1. The clutch C1 connects, in accordance with its engagement state, the sun gear S2 of the rear planetary gear mechanism 22 to the input shaft of the geared transmission mechanism 2 so that the sun gear S2 and the input shaft rotate integrally. The clutch C2 connects, in accordance with its engagement state, the carrier CA1 of the front planetary gear mechanism 21 to the input shaft of the geared transmission mechanism 2 so that the carrier CA1 and the input shaft rotate integrally. The clutch C3 connects, in accordance with its engagement state, the sun gear S1 of the front planetary gear mechanism 21 to the input shaft of the geared transmission mechanism 2 so that the sun gear S1 and the input shaft rotate integrally. The brake B1 locks, in accordance with its engagement state, rotation of the sun gear S1 of the front planetary gear mechanism 21. The brake B2 locks, in accordance with its engagement state, rotation of the carrier CA1 of the front planetary gear mechanism 21 and rotation of the ring gear R2 of the rear planetary gear mechanism 22. Further, the one-way clutch F1 limits rotational directions of the carrier CA1 of the front planetary gear mechanism 21 and the ring gear R2 of the rear planetary gear mechanism 22 to one direction. The geared transmission 2 also has a vehicle speed sensor 23, which detects the rotational speed of the output shaft of the geared transmission 2, thereby detecting the vehicle speed.

The hybrid vehicle has an electronic control unit 3, which serves as the control section and controls the hybrid system 1 and the geared transmission 2. The electronic control unit 3 includes a central processing unit (CPU) that executes various types of computational processes related to the control of the hybrid system 1, a read-only memory (ROM) that stores control programs and data, a random access memory (RAM) that temporarily stores computation results of the CPU and detection results of various sensors, and an input-output port (I/O) that inputs and outputs signals from and to the outside. The input port of the electronic control unit 3 receives detection signals of various sensors that sense the traveling state of the vehicle, including the first and second resolvers 12, 13 and the vehicle speed sensor 23. Based on the detection results of the sensors, the electronic control unit 3 controls the internal combustion engine 10, the first and second electric motors M1, M2, and the geared transmission 2.

Figures 2, 3:
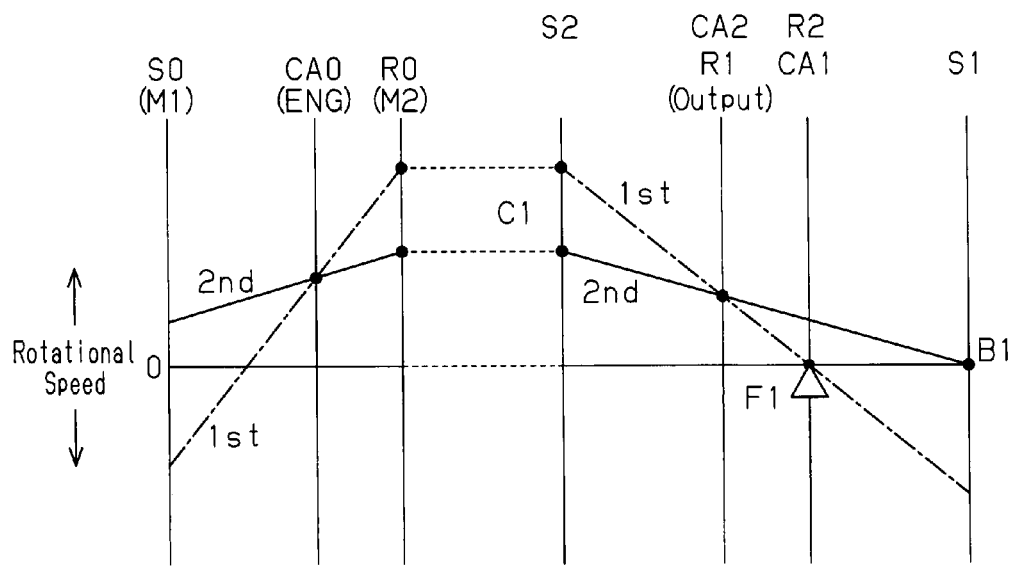
FIG. 2 is a chart showing the relationship between the gear of the geared transmission provided in the drive train of FIG. 1 and the operational modes of frictional engagement elements.
FIG. 3 is a graph showing the relationship among the rotational speeds of the rotational elements when either the 1st gear or the 2nd gear is selected in the vehicle to which the first embodiment is applied.

FIG. 2 shows operational states of the frictional engagement elements of the geared transmission 2 in each selected gear. For example, the geared transmission 2 operates at the 1st gear by engaging the clutch C1, the brake B2, and the one-way clutch F1. The geared transmission 2 operates at the 2nd gear by engaging the clutch C1 and the brake B1. The geared transmission 2 executes downshift from the 2nd gear to the 1st gear by disengaging the brake B1 and engaging the brake B2 and the one-way clutch F1.

FIG. 3 shows the relationship between the rotational speeds of rotational elements in the hybrid system 1 and the geared transmission 2 at the 1st gear and the 2nd gear. Either at the 1st gear or at 2nd gear, the clutch C1 connects the input shaft 20 of the geared transmission 2 to the sun gear S2 of the rear planetary gear mechanism 22 so that the input shaft 20 and the sun gear S2 can rotate integrally. Therefore, at the 1st gear and the 2nd gear, the rotational speed of the sun gear S2 of the rear planetary gear mechanism 22 is equal to the rotational speed of the ring gear R0 of the power distribution mechanism 11, which is the output of the hybrid system 1. In this state, the geared transmission 2 operates at the 1st gear by locking, with the one-way clutch F1, rotation of the carrier CA1 of the front planetary gear mechanism 21 and the ring gear R2 of the planetary gear mechanism 22. Also, in this state, the geared transmission 2 operates at the 2nd gear by locking, with the brake B1, rotation of the sun gear S1 of the front planetary gear mechanism 21. Therefore, downshift from the 2nd gear to the 1st gear is achieved by disengaging the brake B1, reducing to zero the rotational speed of the carrier CA1 of the front planetary gear mechanism 21 and the rotational speed the ring gear R2 of the rear planetary gear mechanism 22, and increasing the input rotational speed of the geared transmission 2 (at this time, the rotational speed of the sun gear S1 of the rear planetary gear mechanism 22) to such a level at which the one-way clutch F1 functions.

In the hybrid vehicle as described above, the electronic control unit 3 realizes synchronization of the frictional engagement elements related to shift change of the geared transmission 2 through adjustment of rotational speeds of the internal combustion engine 10 and the first and second electric motors M1 and M2 of the hybrid system 1. For example, when downshifting from the 2nd gear to the 1st gear, the electronic control unit 3 raises the rotational speed of the second electric motor M2, thereby raising the input rotational speed of the geared transmission 2 until rotation of the carrier CA1 of the front planetary gear mechanism 21 and rotation of the ring gear R2 of the rear planetary gear mechanism 22 are locked by the one-way clutch F1.

At such downshift of the geared transmission 2, synchronization shock can occur upon engagement between frictional engagement elements. For example, at downshift from the 2nd gear to the 1st gear, shock can occur when the one-way clutch F1 locks rotation of the carrier CA1 of the front planetary gear mechanism 21 and rotation of the ring gear R2 of the rear planetary gear mechanism 22. FIG. 4(a) shows changes in the input rotational speed of the geared transmission during downshift when the vehicle deceleration is small, and FIG. 4(b) shows changes in the input rotational speed of the geared transmission during downshift when the vehicle deceleration is great. As shown in FIG. 4(a), when the deceleration of the vehicle is small, the change gradient in a speed reduction of the geared transmission 2 of the synchronization rotational speed is small. Even if the change gradient in a speed increase of the input rotational speed is relatively large to some extent, the incident angle of the input rotational speed relative to the synchronization rotational speed is a large angle α, so that no excessive shock is produced. On the other hand, when the vehicle deceleration is great, the change gradient in a speed reduction of the synchronization speed of the geared transmission 2 is great. Therefore, as shown by dotted line in FIG. 4(b), the incident angle of the input rotational speed relative to the synchronization speed will be a small angle β even if the change gradient in a speed increase of the input rotational speed is set to a value equivalent to that in FIG. 4(a). Therefore, when the vehicle deceleration is great, an excessive synchronization shock is likely to be produced.

In the geared transmission 2, the downshift from the 2nd gear to 1st gear is more likely to produce an excessive synchronization shock than other downshifts. The downshift from the 2nd gear to the 1st gear is completed by engagement of the one-way clutch F1 provided in the geared transmission 2. The torque transmitting capacity of the one-way clutch F1 remains zero until immediately before the rotational direction of the carrier CA1 of the front planetary gear mechanism 21 and the ring gear R2 of the rear planetary gear mechanism 22 are reversed. In contrast, the clutches C1 to C3 and the brakes B1, B2 are configured to perform engagement by gradually increasing the torque transmitting capacity of the frictional members, and the change gradient in a speed increase of the input rotational speed of the geared transmission 2 is reduced as the torque transmitting capacity is gradually increased. That is, the clutches C1 to C3 and the brake B1, B2 have functions to reduce synchronization shock per se. The one-way clutch F1, on the other hand, does not have sufficient function for reducing synchronization shock. Accordingly, the downshift from the 2nd gear to the 1st gear, which is completed by engagement of the one-way clutch F1, is likely to cause a greater synchronization shock.

In the present embodiment, the electronic control unit 3 controls the input rotational speed of the geared transmission 2 during downshift in the manner described below, thereby smoothly executing the downshift from the 2nd gear to the 1st gear without producing an excessive synchronization shock. That is, according to the present embodiment, the electronic control unit 3 variably sets the change gradient in a speed increase of the input rotational speed of the geared transmission 2 during downshift in accordance with the deceleration of the vehicle. When the vehicle deceleration is great, the electronic control unit 3 reduces the change gradient in a speed increase of the input rotational speed of the geared transmission 2 during downshift, thereby making the incident angle of the input rotational speed relative to the synchronization rotational speed a large angle γ to reduce synchronization shock.

FIG. 5 is a flowchart showing a synchronization control routine employed in the present embodiment. The process of this routine is executed by the electronic control unit 3 each time the geared transmission 2 performs downshift.

When downshift of the geared transmission 2 is requested and the routine is started, the electronic control unit 3 reads the current deceleration of the vehicle at step S101. In the subsequent step S102, the electronic control unit 3 calculates a target change gradient of the input rotational speed of the geared transmission 2 during downshift in accordance with the read deceleration of the vehicle. The greater the vehicle deceleration, the smaller the value is set to of the target change gradient.

At step S103, the electronic control unit 3 checks whether the current state allows the input rotational speed of the geared transmission 2 to be adjusted with the second electric motor M2. Specifically, at step S103, it is checked whether adjustment of the rotational speed of the second electric motor M2 is difficult due to insufficient charging of battery or overheating of the motor M2. If it is possible to adjust the input rotational speed of the geared transmission 2 with the second electric motor M2 (S103: YES), the electronic control unit 3 proceeds to step S104. At step S104, the electronic control unit 3 adjusts the input rotational speed of the geared transmission 2 with the second electric motor M2 so as to realize the calculated target change gradient. If it is not possible to adjust the input rotational speed of the geared transmission 2 with the second electric motor M2 (S103: NO), the electronic control unit 3 proceeds to step S105. At step S105, the electronic control unit 3 adjusts the input rotational speed of the geared transmission 2 with the internal combustion engine 10 so as to realize the calculated target change gradient.

The present preferred embodiment as described above has the following advantages.

(1) According to the present embodiment, the electronic control unit 3 adjusts the input rotational speed of the geared transmission 2 during downshift such that the greater the deceleration of the vehicle, the smaller the change gradient in a speed increase of the input rotational speed becomes. Therefore, when the deceleration of the vehicle is great and the change gradient in a speed reduction of the post-shifting synchronization rotational speed is great, the incident angle of the input rotational speed of the geared transmission 2 relative to the post-shifting synchronization rotational speed is maintained to a large angle. Therefore, according to the shift control device of the present embodiment, downshift is smoothly executed without producing an excessive synchronization shock even when the deceleration of the vehicle is great during downshift.

(2) In the present embodiment, the downshift from the 2nd gear to the 1st gear is completed by the engagement of the one-way clutch F1 to reduce the torque transmitting capacity of the frictional engagement elements to zero during the downshift. At the downshift, the control of the input rotational speed as shown above is executed. Therefore, even under a condition where an excessive shock is likely to be produced, occurrence of synchronization shock is reliably inhibited.

Second Embodiment

A vehicular shift control device according to a second embodiment of the present invention will be described with reference to FIGS. 6 to 8. In the present and subsequent embodiments, the components common to the above described embodiment will be given the same reference numerals, and detailed explanations thereof are omitted.

In the first embodiment described above, when the deceleration of the vehicle is great, the change gradient in a speed increase of the input rotational speed of the geared transmission 2 is reduced over the entire period of downshift from the start of the inertia phase to the completion of synchronization. In this manner, even when the vehicle deceleration is great, an excessive synchronization shock can be inhibited. If the change gradient in a speed increase of the input rotational speed of the geared transmission 2 is reduced over the entire period of downshift, the period in which the input rotational speed is increased to the post-shifting synchronization rotational speed is extended. This lowers the responsiveness to shift change. However, inhibition of synchronization shock, that is, a large angle of the incident angle of the input rotational speed relative to the post-shifting synchronization rotational speed can be achieved if the change gradient of the input rotational speed at the time when the input rotational speed reaches the post-shifting synchronization rotational speed is small.

Accordingly, in the present embodiment, reduction in the change gradient of the input rotational speed of the geared transmission 2 in accordance with the deceleration of the vehicle is executed only at a stage immediately before the completion of the downshift. It is therefore possible to inhibit the occurrence of an excessive synchronization shock when the vehicle deceleration is great and to prevent the shifting response from being degraded. To implement the configuration of the present embodiment, the change gradient in a speed increase of the input rotational speed of the geared transmission 2 during downshift is calculated in accordance with the deceleration of the vehicle and the degree of progress of shifting by the geared transmission 2.

In the present embodiment, the degree of progress of shifting by the geared transmission 2 is checked by using the ratio of the difference between the input rotational speed and the pre-shifting synchronization rotational speed to the difference of the synchronization rotational speed between before and after shifting. Specifically, the degree of progress of shifting by the geared transmission 2 is checked based on a ratio of (b/(a+b)), in which (a+b) represents the sum of a rotational speed difference "a" and a rotational speed difference "b" shown in FIG. 6. The value of such a ratio changes from zero to one in accordance with the degree of progress of shifting by the geared transmission 2. The rotational speed difference "a" represents the difference between the post-shifting synchronization rotational speed and the input rotational speed, and the rotational speed difference "b" represents the difference between the input rotational speed and the pre-shifting synchronization rotational speed.

Figure 7:
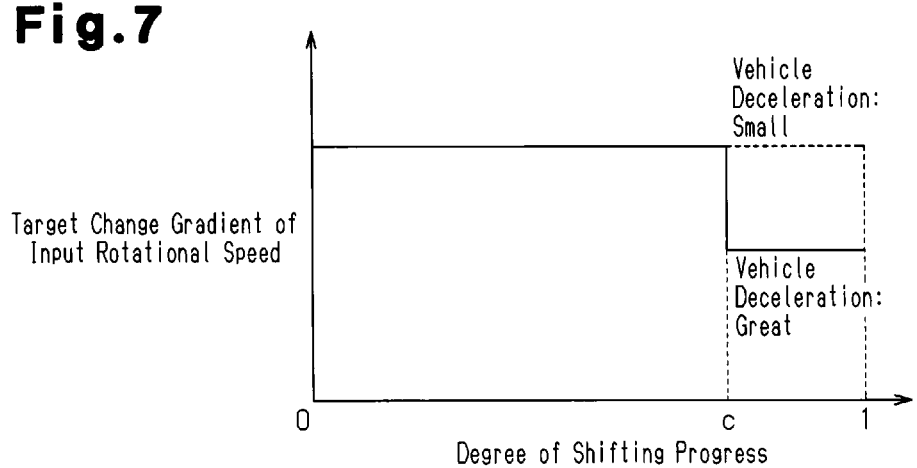
FIG. 7 is a graph showing the relationship among the deceleration of the vehicle, the degree of progress of shifting in the geared transmission, and the change gradient of the input rotational speed of the geared transmission in the second embodiment.

According to the present embodiment, the target change gradient of the input rotational speed of the geared transmission 2 during downshift is set in a manner described in FIG. 7. That is, in the present embodiment, the target change gradient when the deceleration of the vehicle is small is set to a constant value regardless of the degree of progress of shifting. On the other hand, the value of the target change gradient when the deceleration of the vehicle is great is decreased when the degree of progress of shifting exceeds a predetermined value "c".

Figure 8:
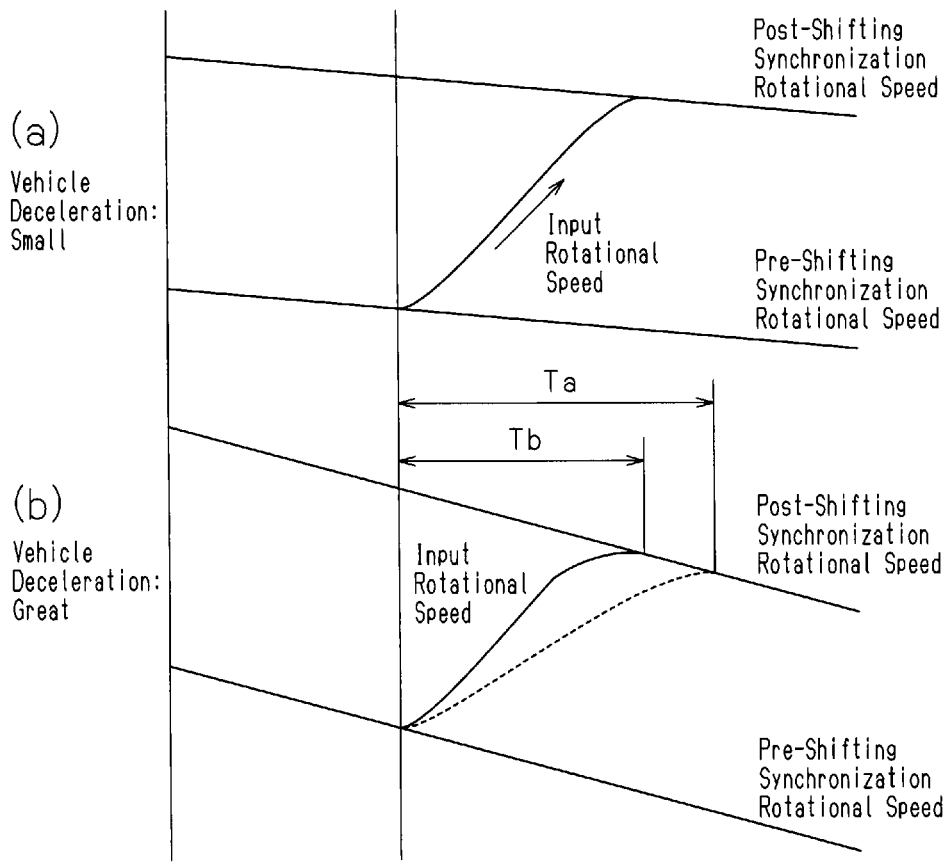
FIG. 8 is a graph showing changes in the input rotational speed of the geared transmission during downshift in the first embodiment, where section (a) shows a case where the vehicle deceleration is small, and section (b) shows a case where the vehicle deceleration is great.

FIG. 8(*a*) shows changes in the input rotational speed of the geared transmission 2 during downshift according to the present embodiment when the vehicle deceleration is small, and FIG. 8(*b*) shows changes in the input rotational speed of the geared transmission 2 during downshift according to the present embodiment when the vehicle deceleration is great. In FIG. 8(*b*), the dotted line shows changes in the input rotational speed of the geared transmission 2 in a case where the change gradient is set to a small value over the entire period of downshift. As in the diagram, a period Tb, which is required for downshift to be completed when the change gradient is set to a small value only at a stage immediately before the completion of downshift, is shorter than a period Ta, which is required for downshift to be completed when the change gradient is set to a small value over the entire period of downshift.

According to the present embodiment, the following advantage is achieved in addition to advantages (1) and (2) shown above.

(3) The electronic control unit 3 of the present embodiment calculates the change gradient of the input rotational speed of the geared transmission 2 during downshift in accordance with the deceleration of the vehicle and the degree of progress of shifting by the geared transmission 2. The electronic control unit 3 performs reduction of the change gradient of the input rotational speed in accordance with the deceleration of the vehicle only at the stage immediately before the completion of downshift. Accordingly, in the present embodiment, it is possible to inhibit the occurrence of a synchronization shock when the vehicle deceleration is great and prevent the shifting response from being degraded accordingly.

Third Embodiment

In the second embodiment, the degree of progress of shifting by the geared transmission 2 is checked by using the ratio of the difference between the input rotational speed and the pre-shifting synchronization rotational speed to the difference of the synchronization rotational speed between before and after shifting. The degree of progress of shifting can also be checked by using the deviation between the post-shifting synchronization speed and the input rotational speed of the geared transmission 2. In this regard, according to the present embodiment, a target change gradient is calculated according to the deceleration of the vehicle and the deviation between the post-shifting synchronization rotational speed and the input rotational speed in the geared transmission 2, and the input rotational speed of the geared transmission 2 during downshift is controlled accordingly.

Figure 9:
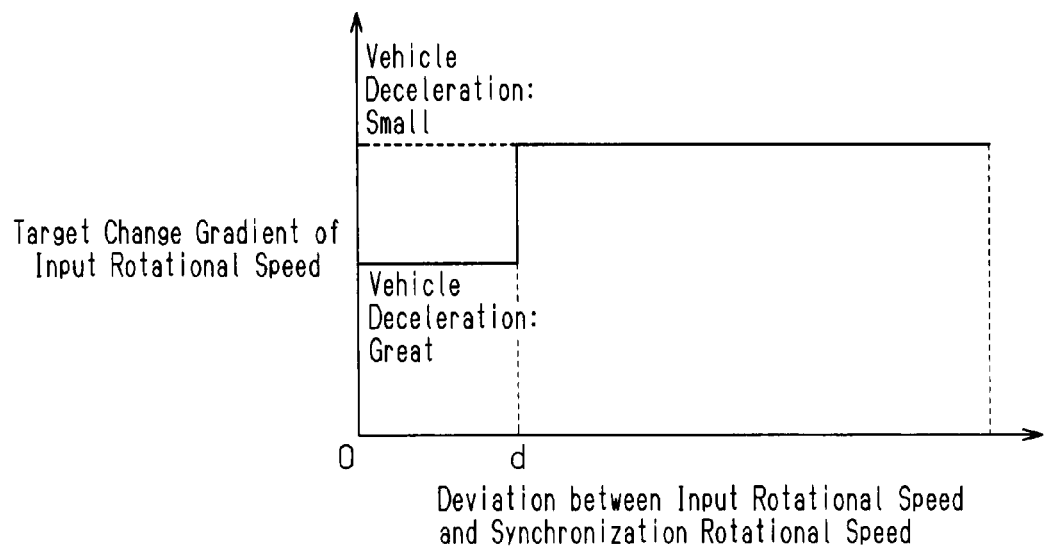
FIG. 9 is a graph showing the relationship among the deviation between the input rotational speed and the post-shifting synchronization rotational speed in a geared transmission in a vehicular shift control device according to a third embodiment, the deceleration of the vehicle, and the change gradient of the input rotational speed of the geared transmission.

Specifically, the target change gradient of the input rotational speed of the geared transmission 2 during downshift is set in a manner described in FIG. 9 in the present embodiment. That is, in the present embodiment, the target change gradient when the deceleration of the vehicle is small is set to a constant value regardless of the deviation between the post-shifting synchronization rotational speed and the input rotational speed. On the other hand, the value of the target change gradient when the deceleration of the vehicle is great is decreased when the deviation becomes less than or equal to a predetermined value "d". In this case, the same advantages as the second embodiment are achieved.

Fourth Embodiment

In the previous embodiments, a target change gradient is set in accordance with the deceleration of the vehicle, and the rotational speed of, for example, the second electric motor M2 is adjusted such that the input rotational speed of the geared transmission 2 during downshift becomes equal to the target change gradient. Accordingly, the incident angle of the input rotational speed relative to the post-shifting synchronization rotational speed is reduced in the geared transmission 2, so that an excessive synchronization shock is avoided when the vehicle deceleration is great. In contrast to this, in the present embodiment, a target rotational speed that is a target value of the post-shifting synchronization rotational speed of the geared transmission 2 during downshift is varied in accordance with the deceleration of the vehicle, so as to adjust the change gradient of the input rotational speed of the geared transmission 2 according to the deceleration of the vehicle, and a similar objective is achieved.

Figure 10:
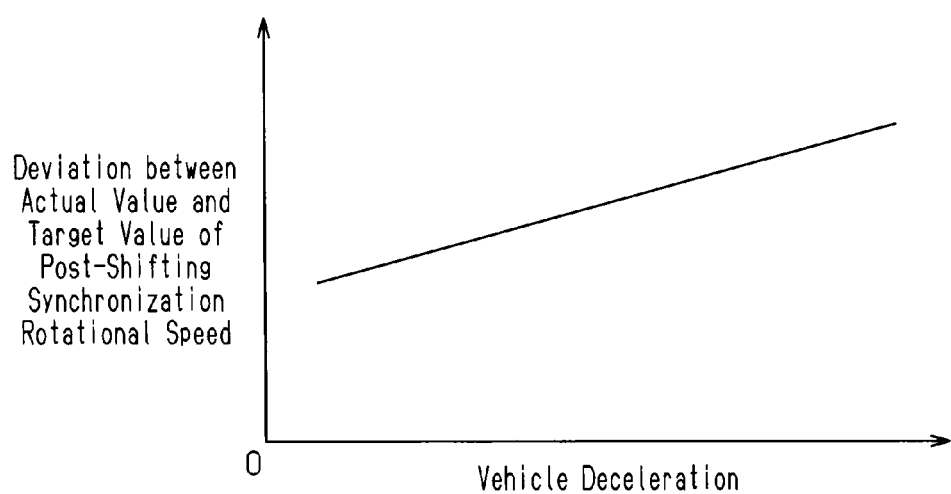
FIG. 10 is a graph showing the relationship between the deceleration of the vehicle and the deviation between the actual value and the target value of the post-shifting synchronization rotational speed in a vehicular shift control device according to a fourth embodiment of the present invention.

Specifically, when calculating the target rotational speed, the electronic control unit 3 calculates a deviation according to the deceleration of the vehicle. The deviation is a value representing the difference between the actual value of the post-shifting synchronization rotational speed and a target value thereof (a target rotational speed). As shown in FIG. 10, the greater the deceleration of the vehicle, the greater the value that is set for the deviation. The electronic control unit 3 subtracts the deviation from the actual post-shifting synchronization rotational speed at the time, and sets the resultant as a target rotational speed. Therefore, the greater the deceleration of the vehicle, the greater becomes the amount by which the target rotational speed is less than the actual post-shifting synchronization rotational speed. After setting the target rotational speed, the electronic control unit 3 adjusts the rotational speed of, for example, the second electric motor M2 such that the input rotational speed of the geared transmission 2 becomes equal to the target rotational speed.

Figure 11:
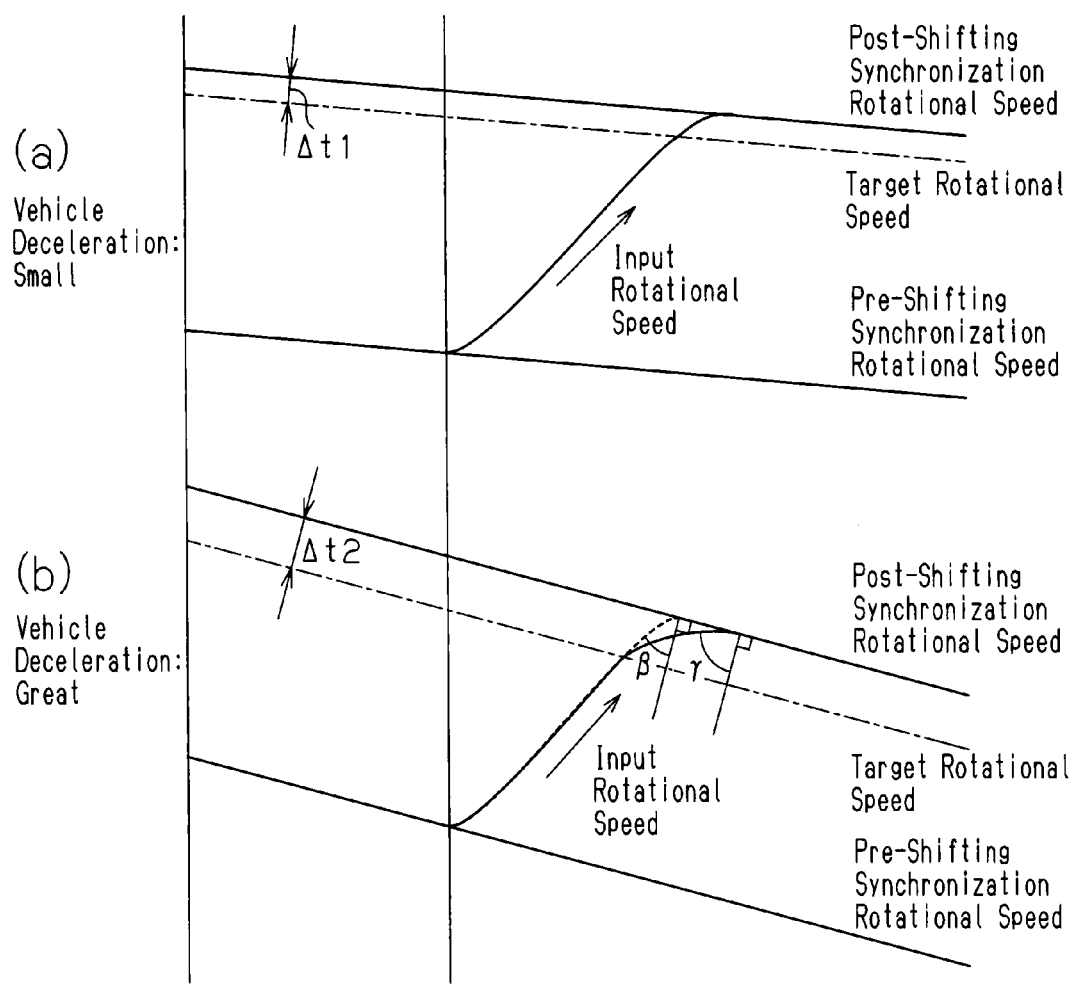
FIG. 11 is a graph showing changes in the input rotational speed of the geared transmission during downshift in the fourth embodiment, where section (a) shows a case where the vehicle deceleration is small, and section (b) shows a case where the vehicle deceleration is great.
Figure 12:
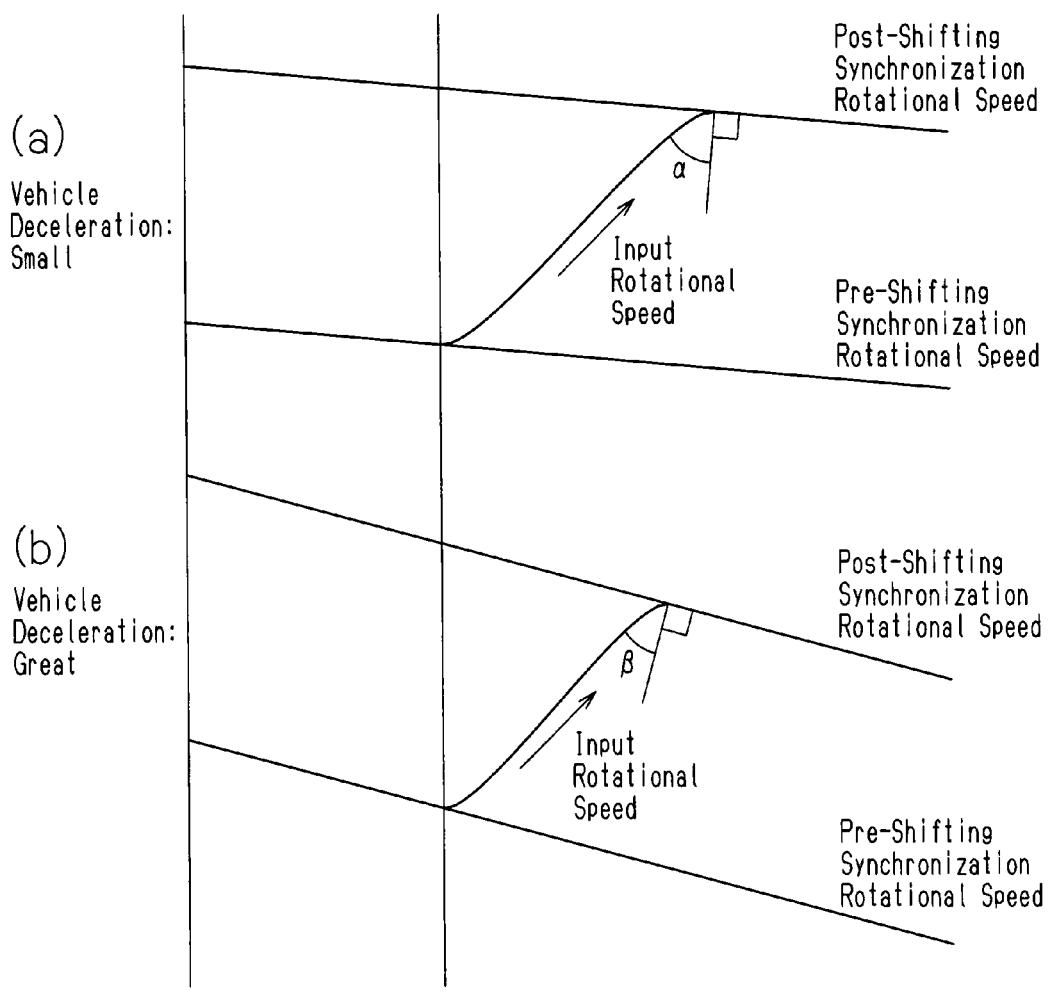
FIG. 12 is a graph showing changes in the input rotational speed of the geared transmission during downshift in a conventional vehicular shift control device, where section (a) shows a case where the vehicle deceleration is small, and section (b) shows a case where the vehicle deceleration is great.

FIG. 11(a) shows changes in the input rotational speed of the geared transmission 2 during downshift according to the present embodiment when the vehicle deceleration is small, and FIG. 11(b) shows changes in the input rotational speed of the geared transmission 2 during downshift according to the present embodiment when the vehicle deceleration is great. As shown in the graphs, the target rotational speed when the vehicle deceleration is great is determined such that a deviation Δt2 between the actual value of the post-shifting synchronization rotational speed and the target rotational speed is greater than the deviation Δt1 that corresponds to a state where the vehicle deceleration is small.

Until the input rotational speed of the geared transmission 2 reaches the target rotational speed, the input rotational speed is raised through adjustment of the rotational speed of, for example, the second electric motor M2. After reaching the target rotational speed, the input rotational speed of the geared transmission 2 increases through inertial until it reaches the post-shifting synchronization rotational speed. The increase of the input rotational speed becomes sluggish as time elapses. Accordingly, the change gradient in a speed increase of the input rotational speed decreases as time elapses.

In FIG. 11(b), the dotted line shows a change in the input rotational speed in a case where the target rotational speed is set in the same manner as the case where the target rotational speed is set when the deceleration of the vehicle is small. At this time, since the input rotational speed is raised through adjustment of the rotational speed of, for example, the second electric motor M2, until it reaches the vicinity of the post-shifting synchronization rotational speed, the change gradient of the input rotational speed at the time it actually reaches the post-shifting synchronization rotational speed is still great. In this case, the incident angle of the input rotational speed relative to the post-shifting synchronization rotational speed becomes a small angle β, which produces a great synchronization shock.

In contrast to this, the increase of the input rotational speed by adjustment of the rotational speed of, for example, the second electric motor M2 is ended at an early stage in the present embodiment. Thus, the change gradient of the input rotational speed at the time it actually reaches the post-shifting synchronization rotational speed is sufficiently small. Therefore, in this case, the incident angle of the input rotational speed relative to the post-shifting synchronization rotational speed becomes a large angle γ, which prevents an excessive synchronization shock from being produced.

According to the present embodiment described above, the following advantages is achieved in addition to advantages (1) and (2) shown above.

(4) The electronic control unit 3 of the present embodiment variably sets a target value of the post-shifting synchronization rotational speed of the geared transmission (target rotational speed) in accordance with the deceleration of the vehicle, so as to adjust the change gradient of the input rotational speed of the geared transmission 2 according to the deceleration of the vehicle. In this case also, the greater the vehicle deceleration, the greater becomes the value by which the target rotational speed is smaller than the actual post-shifting synchronization rotational speed. This allows the incident angle of the input rotational speed relative to the post-shifting synchronization rotational speed to be increased. Therefore, the vehicular shift control device according to the present embodiment is capable of smoothly executing downshift without producing an excessive synchronization shock.

(5) Depending on the setting of the target rotational speed, reduction in the change gradient of the input rotational speed of the geared transmission 2 in accordance with the vehicle deceleration is executed only in a stage immediately before the completion of downshift. Accordingly, in the present embodiment, it is possible to inhibit the occurrence of a synchronization shock when the vehicle deceleration is great and prevent the shifting response from being degraded accordingly.

The above described embodiments may be modified as follows.

In the above illustrated embodiments, the present invention is applied to a vehicle having a geared transmission 2, in which downshift is completed upon engagement of the one-way clutch F1 in some cases, and the torque transmitting capacity of the frictional engagement elements becomes zero during downshift in some cases. However, the vehicular shift control device according to the present invention may be applied to vehicles having geared transmissions of other configurations.

In the above illustrated embodiments, the present invention is applied to a vehicle that includes a geared transmission 2 formed by two planetary gear mechanisms 21, 22. However, the present invention may be applied to vehicles provided with geared transmissions having any configuration.

In the above illustrated embodiments, the input rotational speed of the geared transmission 2 during downshift is controlled through adjustment of the rotational speed of the second electric motor M2 in a normal state. If such control is difficult, similar control of the input rotational speed is executed through adjustment of the rotational speed of the internal combustion engine 10. However, if the adjustment of the rotational speed by the second electric motor M2 is always possible, the electric motor M2 may be always used when controlling the input rotational speed of the geared transmission 2 during downshift. In contrast, if the adjustment of the rotational speed by the second electric motor M2 is always difficult, the internal combustion engine 10 may be always used when controlling the input rotational speed of the geared transmission 2 during downshift. Alternatively, the input rotational speed of the geared transmission 2 during downshift may be controlled by using the first electric motor M1.

In the above illustrated embodiments, the present invention is applied to a hybrid vehicle that includes a hybrid system 1 as a drive source, which includes an internal combustion engine 10 and two electric motors M1, M2. However, the vehicular shift control device according to the present invention may be applied to vehicles having a hybrid system other than that described above as a drive source. Specifically, the present invention may be applied to a vehicle having as a drive source only an internal combustion engine or an electric motor.

The invention claimed is:

1. A vehicular shift control device comprising:
   a geared transmission that changes and outputs rotation of a drive source mounted on a vehicle; and
   a control section that adjusts, at downshift of the geared transmission, a rotational speed of the drive source, thereby controlling an input rotational speed of the geared transmission,
   wherein the control section operates such that the greater a deceleration of the vehicle, the smaller a change gradient of the input rotational speed of the geared transmission becomes.

2. The vehicular shift control device according to claim 1, wherein the change gradient of the input rotational speed of the geared transmission is calculated in accordance with the deceleration of the vehicle and a degree of progress of shifting in the geared transmission.

3. The vehicular shift control device according to claim 2, wherein the control section reduces the change gradient of the input rotational speed of the geared transmission in a stage immediately before the completion of the downshift.

4. The vehicular shift control device according to claim 3, wherein the torque transmitting capacity of frictional engagement elements of the geared transmission is made zero during downshift of the geared transmission.

5. The vehicular shift control device according to claim 1, wherein the change gradient of the input rotational speed of the geared transmission is calculated in accordance with the deviation between the input rotational speed and a synchronization rotational speed of the geared transmission and with the deceleration of the vehicle.

6. The vehicular shift control device according to claim 5, wherein the control section reduces the change gradient of the input rotational speed of the geared transmission in a stage immediately before the completion of the downshift.

7. The vehicular shift control device according to claim 6, wherein the torque transmitting capacity of frictional engagement elements of the geared transmission is made zero during downshift of the geared transmission.

8. The vehicular shift control device according to claim 1, wherein the change gradient of the input rotational speed of the geared transmission is adjusted by variably setting a target value of a post-shifting synchronization rotational speed of the geared transmission in accordance with the deceleration of the vehicle.

9. The vehicular shift control device according to claim 1, wherein the downshift is completed upon engagement of a one-way clutch provided in the geared transmission.

10. The vehicular shift control device according to claim 1, wherein the drive source is a hybrid system that includes an internal combustion engine and an electric motor.

11. The vehicular shift control device according to claim 10, wherein the input rotational speed of the geared transmission is controlled through adjustment of the rotational speed of the electric motor.

12. The vehicular shift control device according to claim 10, wherein the input rotational speed of the geared transmission is controlled through adjustment of the rotational speed of the internal combustion engine.

* * * * *